Jan. 3, 1939.   LE ROY. G. STORY   2,142,969
POLYMERIZATION OF GASEOUS HYDROCARBONS
Filed Dec. 28, 1936
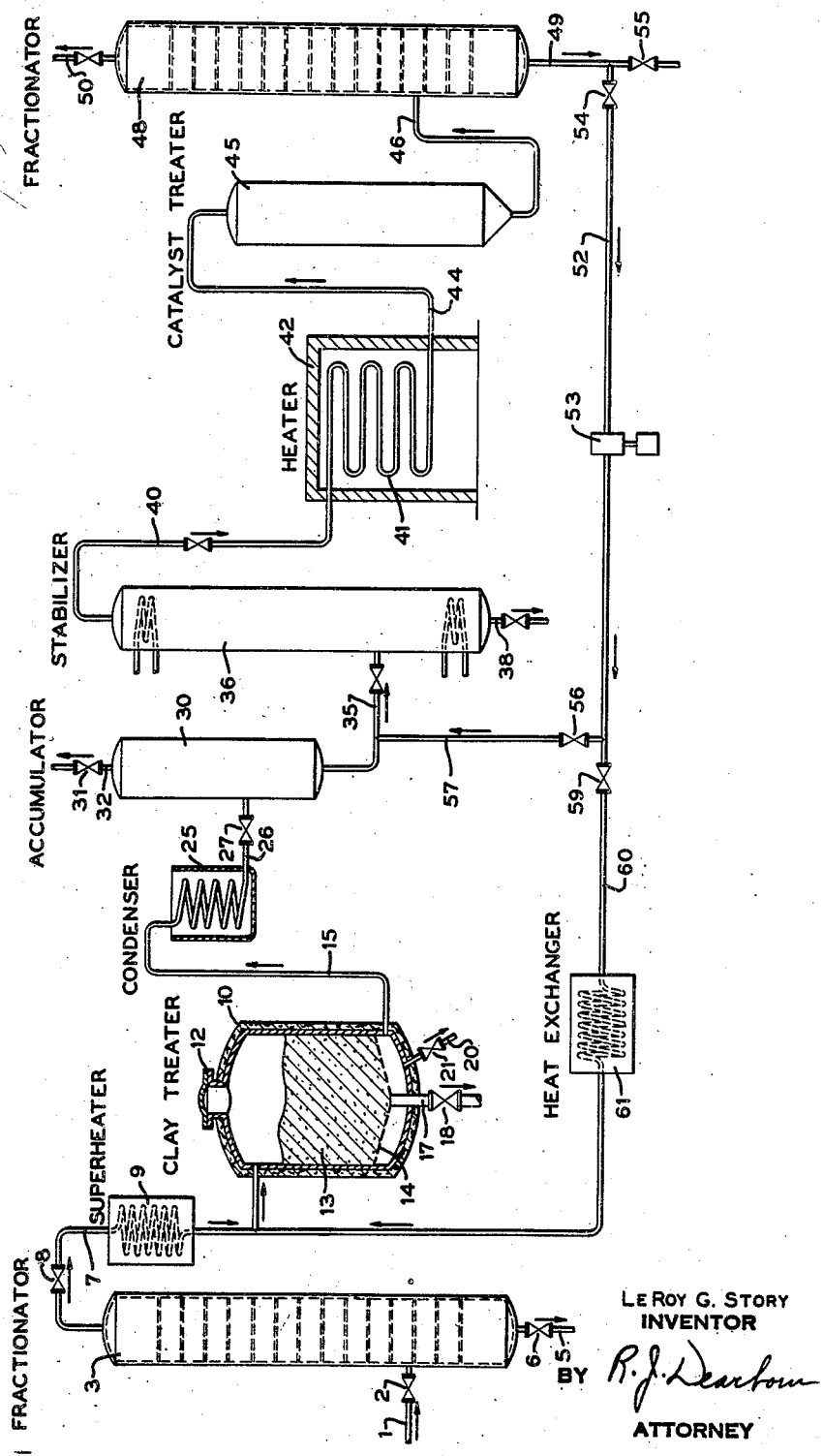
LE ROY G. STORY
INVENTOR
BY R. J. Dearborn
ATTORNEY Patented Jan. 3, 1939

2,142,969

UNITED STATES PATENT OFFICE 2,142,969

POLYMERIZATION OF GASEOUS HYDROCARBONS

Le Roy G. Story, White Plains, N. Y., assignor to The Texas Company, New York, N. Y., a corporation of Delaware Application December 28, 1936, Serial No. 117,794

4 Claims. (Cl. 196—10)

This invention relates to the treatment of cracked hydrocarbon distillates to produce an improved yield of antiknock gasoline therefrom.

The invention contemplates the treatment of cracked hydrocarbon distillates including gasoline hydrocarbons and normally gaseous hydrocarbons below the gasoline boiling point range, by subjecting the distillate to contact with a solid adsorbent catalytic material, to effect polymerization of undesirable gum forming constituents, separating from the treated products a purified gasoline condensate and then subjecting the normally gaseous hydrocarbons containing polymerizable unsaturated constituents to catalytic polymerization in the presence of a polymerizing catalyst to convert the unsaturated constituents into additional gasoline hydrocarbons.

It is commercial practice to subject cracking still or unsaturated refinery gases to catalytic polymerization in the presence of a catalyst, such as phosphoric acid, or one having substantially the properties of phosphoric acid, to polymerize the unsaturated constituents of the gas to hydrocarbons within the gasoline boiling range. In such an operation, however, gummy, resinous or tarry products often accumulate in the catalyst and difficulty may be encountered in maintaining the catalyst in an active condition. Furthermore, the resultant polymer naphtha often contains substantial amounts of unstable constituents which require further refining of the polymer by treating operations such as acid treating or contact with a solid adsorbent material such as fuller's earth.

It has been found that improved results may be obtained if the cracked hydrocarbon distillate, containing the normally gaseous hydrocarbons which are to be thereafter subjected to catalytic polymerization, is contacted with a solid adsorbent catalytic material to remove the more unstable constituents thereof. In accordance with the present invention, the cracked hydrocarbon distillate which contains in addition to gasoline hydrocarbons, normally gaseous hydrocarbons below the gasoline boiling range, is subjected to refining treatment by contact with a solid adsorbent such as fuller's earth, whereby the unstable or gum forming constituents are polymerized. In this way the unstable constituents of the gasoline are polymerized and separated whereby a relatively stable gasoline condensate may be obtained, and also undesirable unstable constituents are polymerized and removed from the normally gaseous hydrocarbons to produce a more desirable charging stock for the catalytic polymerization operation.

The invention will be more fully understood from the following description read in connection with the accompanying drawing which shows a sketch of one type of apparatus for carrying out the process of the invention.

In practicing the invention with an apparatus such as that shown in the drawing, a cracked distillate containing gasoline hydrocarbons and normally gaseous hydrocarbons below the gasoline boiling range, is conducted through the line 1, controlled by valve 2, to a fractionator 3. The cracked distillate so introduced may be in the form of vapor derived from an adjacent still for producing or rerunning cracked distillates. In the fractionator it is preferable that vapors be separated into an overhead fraction of maximum boiling range of approximately that of the final naphtha or gasoline distillate desired. Higher boiling fractions or reflux are withdrawn from the bottom of the fractionator 3 through the line 5, controlled by valve 6, and may be returned to the still. The fractionator 3 may be under substantially superatmospheric pressures of around 100–1000 pounds, although pressures of 500–750 are ordinarily the maximum. The pressure, of course, will depend on the type of still from which the vapors are derived. Overhead vapors from the fractionator 3 pass through the vapor line 7 controlled by valve 8 in which is located a super-heater 9, to a clay treater 10. A super-heater may be used to raise the temperature of the vapors when it is desired to maintain a higher temperature in the clay vapor treater than is possible by the normal temperature of the vapors introduced thereto.

The purpose of the clay treater is to effect removal of undesirable unsaturated constituents such as those normally tending to polymerize to form color and gum constituents on storage. Although I have shown means for carrying out this clay treatment in the vapor phase, it is intended that either liquid or partial liquid and vapor phase treatment may be used. The type of treatment will depend largely on the temperatures and pressures employed and if sufficient superatmospheric pressure is used, the hydrocarbons may be largely in the liquid condition. The clay treater 10 shown in the drawing is the conventional type for the clay vapor treatment of cracked distillates and consists of an insulated shell containing a manhole 12 for introducing solid adsorbent catalytic material 13 which rests on a perforated bottom 14. The solid adsorbent may be fuller's earth, silica gel, or similar compounds commonly used for this purpose. The vapors pass downwardly through the catalytic material and through the perforations in the plate 14 to the outlet line 15. An outlet pipe 17 controlled by valve 18 is provided for removing the spent clay from the treater. The polymerized gum forming constituents which condense and drain into the bottom of the treater may be withdrawn through the line 20 controlled by valve 21.

The conditions maintained in the clay treater may be temperatures of 400–700° F. and pressures substantially the same as those in fractionator 3, or somewhat lower. Pressures of 100–750 and preferably around 200–500 pounds are satisfactory. It is intended that the treatment in the treater 10 will remove sufficient of the unstable constituents to produce a relatively stable gasoline condensate of good color, and also to remove sufficient of the unstable constituents from the normally gaseous hydrocarbons so that when these gaseous hydrocarbons are subjected to catalytic polymerization, a strong polymerizing catalyst will not be unduly impaired and a high quality polymer naphtha will be produced. In some cases, conditions ordinarily employed in the clay vapor treatment of cracked naphtha distillates will be suitable for the purposes of the present invention. However, in some cases, it may be desirable to maintain rather drastic conditions of temperature and pressure in the clay treater whereby a substantial amount of the normally gaseous hydrocarbons is polymerized into normally liquid and resinous materials. The purpose of the clay vapor treatment having been stated, one skilled in the art will be able to maintain conditions in the clay treater which will give the desired results.

The clay treated vapors and gases are conducted from the clay treater through the line 15 to a condenser coil 25, wherein the normally liquid hydrocarbons are condensed and conducted through the run-down line 26, controlled by valve 27 to an accumulator 30. The pressure on the accumulator may be higher or lower than that maintained in the rest of the system and may be controlled by regulating valve 27 and valve 31 in the gas release line 32, communicating with the top of the accumulator. The pressure maintained on the accumulator will determine the amount and character of the gases which are released therefrom. Ordinarily all the hydrogen and methane are separated and released as gases from the accumulator and preferably in addition thereto all or a portion of the C₂ hydrocarbons, and even some of the C₃ hydrocarbons may be liberated. The condensate containing the gasoline constituents and the remaining normally gaseous hydrocarbons are withdrawn from the accumulator and conducted through the valve controlled line 35 to a stabilizer 36. In this stabilizer the condensate is fractionated and a gasoline or naphtha of the desired vapor pressure withdrawn from the bottom thereof through the valve controlled line 38. Ordinarily the condensate so withdrawn contains no substantial amount of C₃ hydrocarbons and may be partially or entirely devoid of C₄ hydrocarbons. The normally gaseous hydrocarbons separated from the distillate are removed from the stabilizer through the vapor line 40.

The normally gaseous hydrocarbons predominating in C₃ and C₄ hydrocarbons which are separated from the clay vapor treated cracked distillate in the stabilizer 36 should be substantially free from undesirable, unstable, gum-forming constituents and contain a considerable portion of unsaturated constituents which are suitable for catalytic polymerization. These gases are conducted through the line 40 to a heating coil 41 located in a furnace 42. In this coil the gases under a pressure of 50–500 pounds and preferably under a pressure of about 100–200 pounds are heated to a temperature of 300–600° F. and preferably around 400–500° F. The vapors are conducted from the heater through transfer line 44 to catalyst treater 45 wherein they contact the active polymerizing catalyst, such as phosphoric acid. Ordinarily this catalyst is in a solid state, such as a mixture of phosphoric acid and fuller's earth, suitably disposed in the chamber to effect intimate contact between the vapors and the catalyst. While phosphoric acid catalyst is preferred, it is to be understood that other polymerizing catalysts such as aluminum chloride, sulfuric acid, etc., may be used. It is intended that in this catalyst treater a major portion or substantially all of the unsaturated or olefin hydrocarbons are polymerized to normally liquid hydrocarbons, preferably within the gasoline boiling range. Ordinarily when the cracked distillate has received proper treatment, in the preliminary clay vapor treatment as described heretofore, the polymerization of the olefins in the catalyst treater should proceed smoothly without substantial or greatly reduced impairment of the active polymerizing catalyst.

The products from the catalyst treater 45 are conducted through the transfer line 46 to a fractionator 48. In this fractionator substantially all the normally liquid hydrocarbons are separated and drawn from the bottom thereof through valve controlled line 49. If the polymerization has proceeded properly, the remaining normally gaseous hydrocarbons should be largely paraffinic and may be released from the top of the fractionator through the valve controlled line 50. It is ordinarily desirable, however, to retain as much of the C₄ hydrocarbons in the polymer naphtha as is feasible for obtaining a blended gasoline of desired Reid vapor pressure. In some cases it may be desirable to recycle the polymer naphtha to the system and in this instance more of the normally gaseous hydrocarbons than ordinarily may be retained in the polymer naphtha, especially if a substantial amount of unsaturated constituents which are desirable for further treatment, is included.

For the purpose of recycling the polymer naphtha a line 52 in which is located pump 53 is provided. By closing valve 55 in line 49 and opening valve 54 in line 52, the polymer naphtha may be returned by way of lines 52 and 57 either to the stabilizer 36 or by the way of lines 52 and 60 to the clay vapor treater 10. In case it is desirable only to stabilize the polymer naphtha and obtain a finished blended gasoline, the valve 56 in the line 57 may be opened and the polymer returned to the stabilizer and commingled with the treated cracked distillate to obtain a finished gasoline of high antiknock value from the stabilizer. In case it is desirable to obtain a highly stabilized product from the system, it may be advantageous to give the polymer naphtha a clay vapor treatment. In order to do this the valve 56 in the line 57 may be closed and the valve 59 in the line 60 opened and the polymer naphtha forced to a heat exchanger 61 wherein it may be partially or entirely vaporized and then introduced into the clay treater in conjunction with the cracked distillate vapors from the fractionator 3.

As an example of the operation of the invention, vapors from a cracking still in which the cracking is largely carried on in the vapor phase, were subjected to fractionation to obtain an overhead product comprising hydrocarbons of maximum boiling range of about 400° F. The vapors and gases are subjected to clay vapor treatment with fuller's earth under a pressure of about 300 pounds and temperature of about 500° F. The clay treated products were cooled to condense substantially all but the products lower than the $C_3$ hydrocarbons and the uncondensed gases separated from the liquids. The condensate was then subjected to further fractionation or stabilization to separate the $C_3$ hydrocarbons and a portion of the $C_4$ hydrocarbons from the stabilized distillate. The normally gaseous hydrocarbons predominating in $C_3$ and $C_4$ hydrocarbons and containing a substantial amount of unsaturated constituents, were heated to about 450° F. under a pressure of about 100 pounds and subjected to polymerization in the presence of a mixture of phosphoric acid and fuller's earth. The polymerized products were fractionated to separate a polymer naphtha which was subsequently blended with the clay vapor treated cracked distillate. Approximately 35% of the normally gaseous hydrocarbons is converted into high antiknock polymer naphtha and when combined with the clay vapor treated cracked distillate a stable gasoline of around 70 octane number is obtained.

The present invention provides a unitary process for producing an improved yield of high quality gasoline from cracking stock; also new and improved results by clay treating the cracked distillate containing the normally gaseous hydrocarbons are obtained. Not only is the cracked gasoline purified but at the same time the gases are also conditioned whereby they may be catalytically polymerized to produce an improved quality of polymer naphtha with substantially less impairment of the efficiency of the active polymerizing catalyst.

Obviously many modifications and variations of the invention, as hereinbefore set forth, may be made without departing from the spirit and scope thereof, and therefore only such limitations should be imposed as are indicated in the appended claims.

I claim:

1. A process for the treatment of cracked distillates, including gasoline hydrocarbons and normally gaseous hydrocarbons below the gasoline boiling-point range, which comprises subjecting the distillate to contact with solid adsorbent catalytic material to effect polymerization of undesirable gum forming constituents, separating from the treated products a liquid fraction containing constituents within the gasoline boiling-point range, also separating from the treated products a normally gaseous hydrocarbon fraction containing polymerizable unsaturated constituents, then subjecting said gaseous hydrocarbon fraction to polymerization in the presence of a catalyst of substantially the polymerizing properties of phosphoric acid whereby said unsaturated constituents are polymerized to normally liquid hydrocarbons and recycling the products from the last mentioned polymerization operation to the first mentioned polymerization operation.

2. A process for the treatment of cracked distillates, including gasoline hydrocarbons and normally gaseous hydrocarbons below the gasoline boiling-point range, which comprises subjecting the distillate in vapor phase to contact with solid adsorptive catalytic material to effect polymerization of the more unstable constituents which tend to polymerize to gummy and resinous materials, separating from the treated vapors a liquid condensate containing gasoline constituents, also separating from the treated vapors a normally gaseous fraction predominating in hydrocarbons of between 2 and 5 carbon atoms and containing polymerizable olefins, subjecting said normally gaseous hydrocarbons to the action of a polymerizing catalyst of substantially the polymerizing properties of phosphoric acid whereby said olefins are polymerized to normally liquid hydrocarbons of gasoline boiling-point range, stabilizing said normally liquid hydrocarbons and recycling the stabilized product to the first mentioned polymerization operation.

3. A process for the treatment of cracked distillates, including gasoline hydrocarbons and normally gaseous hydrocarbons below the gasoline boiling-point range, which comprises subjecting the distillate in vapor phase to contact with solid adsorptive catalytic material to effect polymerization of the more unstable constituents which tend to polymerize to gummy and resinous materials, separating from the treated vapors a liquid condensate containing gasoline constituents, also separating from the treated vapors a normally gaseous fraction predominating in hydrocarbons of between 2 and 5 carbon atoms and containing polymerizable olefins, subjecting said normally gaseous hydrocarbons to the action of a polymerizing catalyst of substantially the polymerizing properties of phosphoric acid whereby said olefins are polymerized to normally liquid hydrocarbons of gasoline boiling point range, and returning the normally liquid hydrocarbons for treatment by said solid adsorbent catalytic material.

4. A process for the manufacture of antiknock motor fuel, which comprises subjecting a cracked distillate, containing gasoline hydrocarbons and normally gaseous hydrocarbons below the gasoline boiling point range, to partial polymerization in the presence of a solid adsorptive catalyst whereby the more reactive constituents thereof are polymerized, fractionating the treated products to obtain a stable gasoline, subjecting the gaseous hydrocarbons to polymerization in the presence of a polymerizing catalyst of the phosphoric acid type to polymerize olefins in said gases to gasoline polymers, separating an unstabilized polymer naphtha from the polymerization products and recycling said polymer to said partial polymerization operation.

LE ROY G. STORY.